(12) United States Patent
Sugihara et al.

(10) Patent No.: US 10,633,469 B2
(45) Date of Patent: Apr. 28, 2020

(54) METHOD FOR PRODUCING HYDROXYL GROUP-CONTAINING VINYL ETHER POLYMER

(71) Applicant: MARUZEN PETROCHEMICAL CO., LTD., Tokyo (JP)

(72) Inventors: Shinji Sugihara, Fukui (JP); Norihiro Yoshida, Ichihara (JP)

(73) Assignee: Maruzen Petrochemical Co., Ltd., Chuo-Ku (JP)

( * ) Notice: Subject to any disclaimer, the term of this patent is extended or adjusted under 35 U.S.C. 154(b) by 42 days.

(21) Appl. No.: 15/579,301

(22) PCT Filed: Jun. 29, 2016

(86) PCT No.: PCT/JP2016/069214
§ 371 (c)(1),
(2) Date: Dec. 4, 2017

(87) PCT Pub. No.: WO2017/006817
PCT Pub. Date: Jan. 12, 2017

(65) Prior Publication Data
US 2018/0179305 A1    Jun. 28, 2018

(30) Foreign Application Priority Data
Jul. 3, 2015    (JP) ................. 2015-134642

(51) Int. Cl.
| C08F 2/10 | (2006.01) |
| C08F 4/04 | (2006.01) |
| C08F 16/04 | (2006.01) |
| C08F 16/26 | (2006.01) |
| C09D 11/00 | (2014.01) |
| C08K 3/18 | (2006.01) |
| C09D 129/10 | (2006.01) |
| C09J 129/10 | (2006.01) |
| C08F 116/14 | (2006.01) |

(52) U.S. Cl.
CPC ............ *C08F 16/26* (2013.01); *C08F 4/04* (2013.01); *C08F 116/14* (2013.01); *C08K 3/18* (2013.01); *C09D 11/00* (2013.01); *C09D 129/10* (2013.01); *C09J 129/10* (2013.01); *C08F 2/10* (2013.01); *C08F 16/04* (2013.01)

(58) Field of Classification Search
None
See application file for complete search history.

(56) References Cited

U.S. PATENT DOCUMENTS

| 5,576,407 A | 11/1996 | Kroner et al. |
| 2015/0005467 A1* | 1/2015 | Sugihara ............ C08F 16/26 526/332 |
| 2018/0371127 A1 | 12/2018 | Yoshida et al. |

FOREIGN PATENT DOCUMENTS

| EP | 0650977 A1 * | 5/1995 | ............. C08F 6/003 |
| EP | 2 816 065 A1 | 12/2014 | |
| EP | 3 395 842 A1 | 10/2018 | |
| JP | H06-511021 A1 | 12/1994 | |
| JP | 2008-303315 A1 | 12/2008 | |
| JP | 2011-021141 A1 | 2/2011 | |
| JP | 2012-229346 A1 | 11/2012 | |
| JP | 2013-166829 A1 | 8/2013 | |
| TW | 201402616 A | 1/2014 | |
| WO | 93/06142 A1 | 4/1993 | |

OTHER PUBLICATIONS

International Search Report and Written Opinion (Application No. PCT/JP2016/069214) dated Aug. 16, 2016.
Extended European Search Report (Application No. 16821286.8) dated Feb. 22, 2019.
Korean Office Action (with English translation), Korean Application No. 10-2017-7033394, dated Oct. 24, 2018 (11 pages).
Japanese Office Action (and translation provided by foreign counsel) from a corresponding Japanese patent application (JP 2015-134642) dated Jun. 18, 2019, 10 pages.

(Continued)

*Primary Examiner* — Richard A Huhn
(74) *Attorney, Agent, or Firm* — Burr & Brown, PLLC

(57) ABSTRACT

A method for producing a hydroxyl group-containing vinyl ether polymer according to the present invention includes: a step of radical polymerizing at least one vinyl ether selected from vinyl ether having a hydroxyl group represented by the following formula (2):

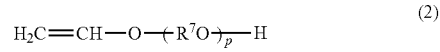

wherein $R^7$ represents an alkylene group which is straight-chained, branched or comprises an alicyclic structure, and p is 1, 2, or 3, in the presence of water as a polymerization solvent and an azo compound represented by the following formula (1) as a polymerization initiator:

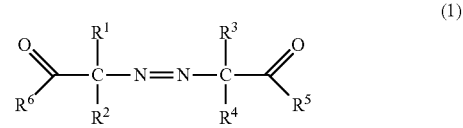

wherein $R^1$ to $R^4$ each independently represent a hydrogen atom or an alkyl group and $R^5$ and $R^6$ each independently represent an alkoxy group optionally having a substituent group or an alkyl amino group optionally having a substituent group.

6 Claims, No Drawings

(56) References Cited

OTHER PUBLICATIONS

Taiwan Office Action (and translation provided by foreign counsel) from a corresponding Taiwan patent application (TW 105121012) dated Aug. 30, 2019.
Chinese Office Action (and translation provided by foreign counsel) from a corresponding Chinese patent application (CN 201680038199.4) dated Sep. 11, 2019.

* cited by examiner

METHOD FOR PRODUCING HYDROXYL GROUP-CONTAINING VINYL ETHER POLYMER

TECHNICAL FIELD

The present invention relates to a simple and efficient method for producing a vinyl ether polymer having a hydroxyl group. More specifically, the present invention relates to a simple and efficient method for producing an aqueous vinyl ether polymer solution having a hydroxyl group.

BACKGROUND ART

Hydroxyl group-containing vinyl ether polymers are excellent in adhesion with a substrate and processability via a cross-linking reaction with various resins, and are useful as main base agents or blending components for paints, inks, adhesives, resin modifiers, metal recovery resins, compatibilizers, surfactants, dispersing agents, binding agents, or the like.

Since vinyl ether generally has an electron-donating substituent, cationic polymerization is used for production. However, since the hydroxyl group induces a termination reaction for a cationic polymerization catalyst, in cases where a vinyl ether polymer containing the hydroxyl group is obtained by the cationic polymerization, monomers with the hydroxyl group being protected are polymerized and thereafter the protective group needed to be removed by deprotection.

Meanwhile, vinyl ether containing hydroxyl group is shown that radical polymerization is possible since the substituent group acts in an electron-attracting way (refer to Patent Document 1). For example, Patent Document 1 discloses bulk polymerization using 2,2'-azobisisobutyronitrile (AIBN) as an initiator or solution polymerization with water as a solvent, for hydroxyl group containing vinyl ethers such as 2-hydroxyethyl vinyl ether and 4-hydroxybutylvinyl ether. However, monomer conversion rate in polymerization using AIBN is low, and it was not possible to carry out polymerization efficiently.

Patent Document 1 also describes that the monomer conversion rate is improved when a non-nitrile azo based initiator such as dimethyl 2,2'-azobis(2-methylpropionate) (MAIB) is used. It describes that the monomer conversion rate is especially improved in a solution polymerization using an alcoholic solvent such as methanol. However, since hydroxyl group containing vinyl ether exhibits lower radical polymerizability compared with other radical polymerizable monomers, the monomer conversion rate was not improved unless a large amount of polymerization initiator was used under the condition as disclosed in Patent Document 1. Further, even when a large amount of polymerization initiator was used, since the monomer conversion rate is not sufficient, a removal step was required of residual monomers or initiator residues.

Further, it has come to light that even when a non-nitrile azo based initiator and an alcoholic solvent are used, polyacetal is generated depending on the kind of alcohol used as a solvent, resulting in a significant reduction of yield of the hydroxyl group-containing vinyl ether polymer of interest.

Moreover, the monomer conversion rate is further reduced for monomers having many carbons and higher hydrophobicity such as vinyl ether having an alkylene group comprising a cycloaliphatic structure, whereby an efficient polymerization was not possible with the method according to Patent Document 1.

PRIOR ART REFERENCES

Patent Documents

[Patent Document 1] Japanese Patent Application Laid-Open Publication No. 2013-166829

SUMMARY OF THE INVENTION

Problems to be Solved by the Invention

The present invention has been made in consideration of the above-described current status and an object of the present invention is to provide a simple and efficient method for producing a hydroxyl group-containing vinyl ether polymer, without the need of a removal step of low boiling point impurities such as residual monomers and initiator residues and acetal, or the like, by improving the monomer conversion rate while reducing the amount of a polymerization initiator to be used, and suppressing generation of polyacetal. Further, an object of the present invention is to provide a simple and efficient method for producing an aqueous polymer solution having a low content of low boiling point impurities such as residual monomers and initiator residues and acetal, or the like.

Means for Solving the Problems

In order to attain the above-described object, the present inventors intensively studied to find that radical polymerization of hydroxyl group-containing vinyl ether under the presence of a certain polymerization solvent and polymerization initiator will allow the monomer conversion rate to be greatly improved, generation of polyacetal to be suppressed, and further the used amount of polymerization initiator to be reduced, as compared with the conventional method, thereby completing the present invention.

That is, according to the first mode of the present invention, provided is a method for producing a hydroxyl group-containing vinyl ether polymer, comprising:

a step of radical polymerizing at least one vinyl ether selected from vinyl ether having a hydroxyl group represented by the following formula (2):

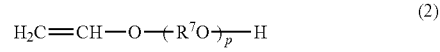
(2)

wherein $R^7$ represents an alkylene group which is straight-chained, branched or comprises an alicyclic structure, and p is 1, 2, or 3, in the presence of water as a polymerization solvent and an azo compound represented by the following formula (1) as a polymerization initiator:

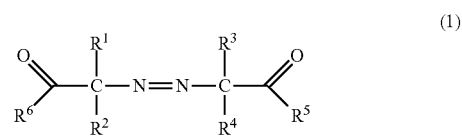
(1)

wherein $R^1$ to $R^4$ each independently represent a hydrogen atom or an alkyl group and $R^5$ and $R^6$ each independently represent an alkoxy group optionally having a substituent group or an alkyl amino group optionally having a substituent group.

In accordance with the first mode of the present invention, it is preferred that said azo compound is an ester type azo compound and $R^5$ and $R^6$ in the above-described formula (1) are each independently an alkoxy group having 1 to 4 carbon atoms.

In accordance with the first mode of the present invention, it is preferred that the amount of residual monomers in the hydroxyl group-containing vinyl ether polymer is 20 mol % or less.

In accordance with the first mode of the present invention, it is preferred that the amount of said azo compound added is from 0.01 to 1 mol % based on said vinyl ether and the number average molecular weight Mn of the hydroxyl group-containing vinyl ether polymer is from 10,000 to 600,000.

In accordance with the first mode of the present invention, it is preferred that the amount of said azo compound added is from 0.1 to 35 mol % based on said vinyl ether and the number average molecular weight Mn of the hydroxyl group-containing vinyl ether polymer is from 1,000 to 10,000.

According to the second mode of the present invention, provided is a method for producing an aqueous hydroxyl group-containing vinyl ether polymer solution comprising water and a hydroxyl group-containing vinyl ether polymer, the method comprising:

a step of radical polymerizing at least one vinyl ether selected from vinyl ether having a hydroxyl group represented by the following formula (2):

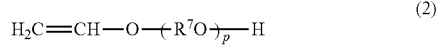

wherein $R^7$ represents an alkylene group which is straight-chained, branched or comprises an alicyclic structure, and p is 1, 2, or 3, in the presence of water as a polymerization solvent and an azo compound represented by the following formula (1) as a polymerization initiator:

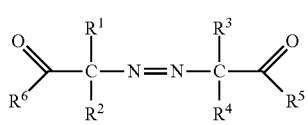

wherein $R^1$ to $R^4$ each independently represent a hydrogen atom or an alkyl group and $R^5$ and $R^6$ each independently represent an alkoxy group optionally having a substituent group or an alkyl amino group optionally having a substituent group; and a step of storing the obtained hydroxyl group-containing vinyl ether polymer in an aqueous solution.

In accordance with the second mode of the present invention, it is preferred that said azo compound is an ester type azo compound and $R^5$ and $R^6$ in the above-described formula (1) are each independently an alkoxy group having 1 to 4 carbon atoms.

In accordance with the second mode of the present invention, it is preferred that the amount of residual monomers in the hydroxyl group-containing vinyl ether polymer is 20 mol % or less.

In accordance with the second mode of the present invention, it is preferred that the amount of said azo compound added is from 0.01 to 1 mol % based on said vinyl ether and the number average molecular weight Mn of the hydroxyl group-containing vinyl ether polymer is from 10,000 to 600,000.

In accordance with the second mode of the present invention, it is preferred that the amount of said azo compound added is from 0.1 to 35 mol % based on said vinyl ether and the number average molecular weight Mn of the hydroxyl group-containing vinyl ether polymer is from 1,000 to 10,000.

According to the third mode of the present invention, provided is an aqueous hydroxyl group-containing vinyl ether polymer solution produced in accordance with the above-described method for producing an aqueous polymer solution.

According to the fourth mode of the present invention, provided is use of the above-described aqueous hydroxyl group-containing vinyl ether polymer solution for producing an aqueous composition selected from the group consisting of paints, inks, adhesives, resin modifiers, metal recovery resins, compatibilizers, surfactants, dispersing agents, and binding agents.

Effect of the Invention

In accordance with the method for producing a polymer by the present invention, there can be provided a simple and efficient method for producing such polymer, without the need of a removal step of low boiling point impurities such as residual monomers and initiator residues and acetal, or the like, by improving the monomer conversion rate while reducing the amount of a polymerization initiator to be used, and suppressing generation of polyacetal in the method for producing a hydroxyl group-containing vinyl ether polymer. Further, in accordance with the method for producing an aqueous polymer solution by the present invention, there can be provided an aqueous polymer solution having a low content of low boiling point impurities such as residual monomers and initiator residues and acetal, or the like, with a simple and efficient method.

MODE FOR CARRYING OUT THE INVENTION

<Method for Producing Polymer and Aqueous Polymer Solution>

The methods for producing a polymer and an aqueous polymer solution according to the present invention are both characterized by comprising a step for radical polymerizing vinyl ether having a hydroxyl group under a certain condition. The method for producing an aqueous polymer solution is characterized by further comprising a step of storing the hydroxyl group-containing vinyl ether obtained by the radical polymerization step. Such radical polymerization step will be described in detail below.

<Polymerization Solvent>

It is essential to use water as a polymerization solvent in the present invention. An aqueous organic solvent may be used in combination to the extent that the effect of the present invention is not impaired. As used herein, aqueous means solubility in water (the amount of solute based on 100 g of water) at 25° C. is 1 g or more. The amount of water used is not particularly limited and is from 5 to 2000 parts by mass, preferably from 10 to 1000 parts by mass, based on 100 parts by mass of vinyl ether containing a hydroxyl group (hereinafter may be referred to as a monomer). The amount of water based on the total amount of the polymer solvent is from 10% by mass or more to 100% by mass or less, preferably 20% by mass or more, more preferably 50% by mass or more.

As for the above-stated aqueous solvent, there can be used, for example, monoalcohols such as methanol, ethanol, isopropanol, n-butyl alcohol, isobutyl alcohol, tert-butyl alcohol, sec-butyl alcohol, tetrahydrofurfuryl alcohol, hexafluoroisopropanol; 2-fluoroethanol, and 3,3,3-trifluoro-1-propanol; polyalcohols such as ethylene glycol, glycerin, and diethylene glycol; ether alcohols such as methyl cellosolve, cellosolve, isopropyropyl cellosolve, butyl cellosolve, ethylene glycol monomethyl ether, ethylene glycol monoethyl ether, diethylene glycol monomethyl ether, and diethylene glycol monoethyl ether; alkyl amides such as dimethylformamide, dimethylacetamide, and N-methylpyrrolidone; alkyl sulfoxides such as dimethyl sulfoxide; ketones such as acetone and methyl ethyl ketone; and cyclic ethers such as tetrahydrofuran and dioxane. These solvents may be used alone or two or more solvents may be mixed to use.

<Radical Polymerization Initiator>

It is essential in the present invention to use an azo compound represented by the following formula (1) as a radical polymerization initiator.

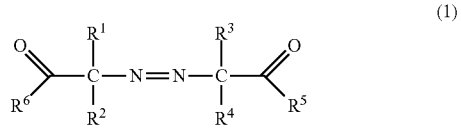

(1)

wherein $R^1$ to $R^4$ each independently represent a hydrogen atom or an alkyl group and $R^5$ and $R^6$ each independently represent an alkoxy group optionally having a substituent group or an alkyl amino group optionally having a substituent group.

In the above-described formula (1), an alkyl group represented by $R^1$ to $R^4$ is preferably an alkyl group having 1 to 4 carbon atoms, in particular, a methyl group, an ethyl group, n-propyl group, isopropyl group, n-butyl group, isobutyl group, tert-butyl group, or the like. Preferably, $R^1$ to $R^4$ is preferably a methyl group.

In the above-described formula (1), an alkoxy group optionally having a substituent group represented by $R^5$ and $R^6$ is preferably an alkyl group having 1 to 4 carbon atoms, in particular, a methoxy group, an ethoxy group, n-propoxy group, isopropoxy group, n-butoxy group, isobutoxy group, sec-butoxy group, tert-butoxy group, or the like. Preferably, $R^5$ and $R^6$ is preferably a methyl group. An alkyl amino group optionally having a substituent group represented by $R^5$ and $R^6$ is preferably an alkyl amino group having 1 to 4 carbon atoms, in particular, a methyl amino group, an ethyl amino group, n-propyl amino group, isopropyl amino group, n-butyl amino group, isobutyl amino group, sec-butyl amino group, tert-butyl amino group, or the like. A substituent group in the alkoxy group and the alkyl amino group include a hydroxyl group, a methoxy group, an ethoxy group, or the like.

Such radical polymerization initiator includes, in particular, ester type azo compounds such as dimethyl 2,2'-azobis (2-methylpropionate) (MAIB), dimethyl 2,2'-azobis(2-methylbutyrate), and dimethyl 2,2'-azobis(2-methylpentanoate); acid amide type azo compounds such as 2,2'-azobis(N-butyl-2-methylpropionamide), 2,2'-azobis[N-(2-propenyl)-2-methylpropionamide], and 2,2'-azobis[2-methyl-N-(2-hydroxyethyl)propionamide. Amongst these, MAIB and 2,2'-azobis[2-methyl-N-(2-hydroxyethyl)propionamide are preferable and MAIB is especially preferable, in view of reactivity and solubility in vinyl ether.

The amount of polymerization initiator to be used is usually set appropriately, depending on the kind and the amount of monomers to be used, the polymerization temperature, polymerization condition such as polymerization concentration, molecular weight of the polymer of interest, or the like, and the method according to the present invention allows polymerization with a smaller amount of initiator than the conventional method. For example, when a polymer having a number average molecular weight of about 10,000 to 600,000, more preferably about 10,000 to 100,000, further preferably about 10,000 to 50,000 is to be obtained, the amount of initiator to be used based on the total amount of monomers is preferably within the range from 0.01 to 1 mol %, more preferably within the range from from 0.05 to 0.5 mol %. On the other hand, when a low molecular weight polymer having a number average molecular weight of about 1,000 to 10,000, more preferably about 2,000 to 9,000, further preferably about 3,000 to 8,000 is to be obtained, an excessive amount of initiator will be used, which often results in difficulty to improve the monomer conversion rate. However, the method according to the present invention will allow reaction with a relatively small use amount of polymerization initiator (preferably from 0.1 to 35 mol %, more preferably from 1 to 20 mol %) and a high monomer conversion rate, even in the case where such low molecular weight polymer is to be obtained. The polymer has a molecular weight distribution (Mw/Mn) preferably within the range from 1.0 to 5.0, more preferably within the range from 1.0 to 4.0, further preferably within the range from 1.2 to 3.0.

<Monomer Component>

Vinyl ether containing a hydroxyl group used in the present invention is represented by the following formula (2):

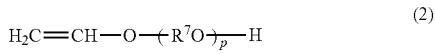

(2)

wherein $R^7$ represents an alkylene group which is straight-chained, branched or comprises an alicyclic structure, and p is 1, 2, or 3.

A straight chained or branched alkylene group represented by $R^7$ in formula (2) is preferably a straight-chained or branched alkylene group having 2 to 8 carbon atoms, in particular, an ethylene group, a 1,2-propylene group, a 1,3-propylene group, a 1,4-butylene group, a 1,5-pentylene group, a neopentylene group, a 1,6-hexylene group, a 4-methyl-2,2-pentylene group, a 3-methyl-1,5-pentylene group, a 2,3-dimethyl-2,3-butylene group, or the like, and especially preferred are an alkylene group having 2 to 4 carbon atoms such as an ethylene group, a 1,2-propylene group, a 1,3-propylene group, and a 1,4-butylene group.

An alkylene group comprising a cycloaliphatic structure represented by $R^7$ is preferably an alkylene group having a monocyclic cycloaliphatic structure, more preferably an alkylene group having a cycloaliphatic structure with a 5 to 6 membered ring, in particular a 1,2-cyclopentylene group, a 1,3-cyclopentylene group, a 1,2-cyclohexylene group, a 1,3-cyclohexylene group, a 1,4-cyclohexylene group, a 1,2-cyclopentane dimethylene group, a 1,3-cyclopentane dimethylene group, a 1,2-cyclohexane dimethylene group, a 1,3-cyclohexane dimethylene group, a 1,4-cyclohexane dimethylene group, or the like.

Repetitive number p of an oxyalkylene group is preferably 1 or 2 in view of polymerization and p=1 is especially preferred.

Examples of vinyl ethers represented by formula (2) are 2-hydroxyethyl vinyl ether, 3-hydroxypropyl vinyl ether, propylene glycol monovinyl ether, 1-hydroxypropane-2-yl vinyl ether, 4-hydroxybutyl vinyl ether, diethylene glycol mono vinyl ether, dipropylene glycol mono vinyl ether, triethylene glycol mono vinyl ether, 4-hydroxy cyclohexyl vinyl ether, 1,4-cyclohexane dimethanol monovinyl ether, or the like. These vinyl ethers may be used alone or two or more vinyl ethers may be mixed to use.

Amongst these vinyl ethers, especially preferred are vinyl ethers comprising a straight chained alkylene group or alkylene oxy alkylene group having about 2 to 4 carbon atoms such as 2-hydroxyethyl vinyl ether, diethylene glycol monovinyl ether, 4-hydroxy butyl vinyl ether, in view of reactivity and simplicity in controlling polymerization.

<Polymerization Condition>

In the production method according to the present invention, the reaction temperature (polymerization temperature) of the polymerization step may be appropriately selected, depending on the kind of polymerization initiator, and reaction (polymerization) may be performed by changing the temperature in a stepwise manner. Generally, the temperature is preferably within the range from 50 to 180° C., more preferably from 60 to 170° C. When the reaction temperature is 50° C. or more, the reaction will be prevented from falling, and when the temperature is 180° C. or less, decomposition of the radical polymerization initiator will be prevented, and the molecular weight of the polymer to be generated which is caused by elevation of chain transfer, will be prevented from decreasing.

Polymerization method is not particularly limited, and for example, polymerization may be initiated by introducing beforehand monomers, a polymerization initiator, and a polymerization solvent if necessary in a vessel, deoxidizing the vessel, then elevating the temperature. Polymerization may also be initiated by adding the polymerization initiator in the heated monomers or monomer solution. The polymerization initiator may be added sequentially or batchwise. These may be combined or a part of the polymerization initiator may be introduced in a reactor beforehand and then the rest may be added sequentially to the reaction system. In the case of sequential addition, the operation will become complicated but it is easier to control the polymerization reaction.

Moreover, when a temperature elevation due to heat generation is in concern or when the reaction rate of multiple monomers becomes high, the monomers or the monomer solution may be added in portions or continuously. In this case, the temperature may be elevated up to the reaction temperature at the time when the monomers or a part of the monomer solution are added into the reactor, and then the rest may be added in portions or sequentially, or the solvent may be introduced in the reactor beforehand, and the monomers or the monomer solution may be added in portions or sequentially into the heated solvent. The polymerization initiator may also be introduced in the reactor beforehand, or it may be added into the reaction system together with or separately from the monomers, or a part of the polymerization initiator may be introduced in the reactor beforehand and the rest may be sequentially added to the reaction system. Such method enables to suppress the temperature elevation due to heat generation and therefore, it is easy to control the polymerization reaction.

After the completion of the reaction, the obtained hydroxyl group-containing vinyl ether polymer can be treated and isolated by well-known operations and treatment methods.

In the method of the present invention, the monomer conversion rate in the polymerization reaction is high; the monomer conversion rate being usually 80% or more, preferably 90% or more, more preferably 95% or more, furthers preferably 97% or more, further more preferably 99% or more. Consequently, the amount of residual monomers in the obtained polymers is usually 20 mol % or less, preferably 10 mol % or less, more preferably 5 mol % or less, further preferably 3 mol % or less, further more preferably 1 mol % or less, even without especially undergoing a step for removing the monomers.

Since the amount of the radical polymerization used is extremely small, it is possible to greatly reduce the residual monomers and catalyst residues in the reaction solution. Further, since generation of polyacetal is suppressed, the reaction solution can be used for a variety of applications as an aqueous hydroxyl group-containing vinyl ether polymer directly, or upon condensation or dilution. For example, the content rate of polyacetal in the polymer is preferably 10 mass % or less, more preferably 5 mass % or less, further preferably 1 mass % or less.

According to the method of the present invention, reaction can be performed efficiently with a high conversion rate of, such as the monomer conversion rate of 80% or more, even with monomers comprising a cycloaliphatic structure such as 1,4-cyclohexane dimethanol mono vinyl ether and having many carbon atoms and higher hydrophobicity.

<Application>

Specifically, such aqueous polymer solution can be used for producing an aqueous composition used for paints, inks, adhesives, resin modifiers, metal recovery resins, compatibilizers, surfactants, dispersing agents, binding agents, or the like.

EXAMPLES

The present invention will be described in more detail below by way of the examples and comparative examples; however the present invention is not interpreted by being limited to the content of the following examples.

Evaluation of the physical property of polymers that were obtained in the Examples was carried out by the following methods.

(1) Calculation of the monomer conversion rate (residual amount) and structure analysis of polymer were carried out using $^1$H NMR (JNM ECX-500II, manufactured by JEOL Ltd.) (solvent: heavy water or heavy chloroform). The value of the residual amount of the monomers is the value measured before undergoing the step of removing the monomers.

(2) Analysis of weight average molecular weight (Mw) and molecular weight distribution (Mw/Mn) was carried out using gel permeation chromatography (GPC).

Analysis Condition

Column: TSK gel column G-MHHR-M x2 (manufactured by Tosoh Corporation)
or Shodex GPC KD804 x3 (manufactured by Showa Denko K. K.)
Solvent: dimethylformamide (containing 10 mmol/L lithium bromide)
Measurement temperature: 40° C.
Flow rate: 1.0 ml/min
Standard curve: standard polystyrene standard

Example 1

Production of poly(2-hydroxyethyl vinyl ether) (1)

To a test tube, a stirring bar, 500 parts by mol of 2-hydroxyethyl vinyl ether (hereinafter, referred to as "HEVE") as a monomer, and 1 mol (0.2 mol % based on a monomer) of MAIB (manufactured by Wako Pure Chemical Industries, Ltd., product name V-601) as a radical polymerization initiator were added, and further, water was added as a polymerization solvent so that the HEVE concentration will be 50 mass %, and they were well dissolved. Then, nitrogen was blown through the test tube to deoxidize. After deoxidization, the test tube was sealed and the polymerization reaction was started in an oil bath of 70° C. After 48 hours, the polymerization was terminated by cooling and exposing to air, and $^1$H NMR analysis and GPC analysis were carried out. As a result, the monomer conversion rate was 99% or more, the number average molecular weight Mn of the obtained polymer was 33900, and the molecular weight distribution Mw/Mn was 2.45 after an elapse of 48 hours.

Example 2

Production of poly(2-hydroxyethyl vinyl ether) (2)

Polymerization reaction was carried out with the similar operation as Example 1 except that water was added so that the HEVE concentration will be 20 mass %. As a result, the monomer conversion rate was 99% or more, the number average molecular weight Mn of the obtained polymer was 10700, and the molecular weight distribution Mw/Mn was 1.59 after an elapse of 48 hours.

Example 3

Production of poly(2-hydroxyethyl vinyl ether) (3)

Polymerization reaction was carried out with the similar operation as Example 1 except that 2,2'-azobis[2-methyl-N-(2-hydroxylethyl) propionamide (manufactured by Wako Pure Chemical Industries, Ltd., product name V-086) was used as a radical polymerization initiator. As a result, the monomer conversion rate was 99% or more, the number average molecular weight Mn of the obtained polymer was 11400, and the molecular weight distribution Mw/Mn was 1.94 after an elapse of 93 hours.

Example 4

Production of poly(4-hydroxybutyl vinyl ether) (1)

Polymerization reaction was carried out with the similar operation as Example 1 except that 4-hydroxylbutyl vinyl ether was used as a monomer. As a result, the monomer conversion rate was 99% or more, the number average molecular weight Mn was 15500, and the molecular weight distribution Mw/Mn was 2.20 after an elapse of 48 hours.

Example 5

Production of poly(1,4-cyclohexanedimethanol monovinyl ether)

Polymerization reaction was carried out with the similar operation as Example 1 except that 1,4-cyclohexanedimethanol monovinyl ether was used as a monomer. As a result, the monomer conversion rate was 81%, the number average molecular weight Mn of the obtained polymer was 12300, and the molecular weight distribution Mw/Mn was 1.89 after an elapse of 48 hours.

Example 6

Production of poly(diethylene glycol monovinyl ether)

Polymerization reaction was carried out with the similar operation as Example 1 except that diethylene glycol monovinyl ether (hereinafter, referred to as "DEGV") was used as a monomer. As a result, the monomer conversion rate was 99% or more, the number average molecular weight Mn of the obtained polymer was 12600, and the molecular weight distribution Mw/Mn was 2.10 after an elapse of 48 hours.

Example 7

Production of poly(2-hydroxylethyl vinyl ether) (4)

Polymerization reaction was carried out with the similar operation as Example 1 except that the amount of MAIB added was 0.1 mol % based on a monomer. As a result, the monomer conversion rate was 60% or more after an elapse of 48 hours, and when the polymerization was further continued, the monomer conversion rate became 99% or more after an elapse of 96 hours. The number average molecular weight Mn of the obtained polymer was 35500, and the molecular weight distribution Mw/Mn was 1.74.

Comparative Example 1

Production of poly(2-hydroxyethyl vinyl ether) (5)

Polymerization reaction was carried out with the similar operation as Example 1 except that toluene was used as a polymerization solvent. As a result, the monomer conversion rate was 49%, the number average molecular weight Mn of the obtained polymer was 18900, and the molecular weight distribution Mw/Mn was 1.68 after an elapse of 24 hours.

Comparative Example 2

Production of poly(2-hydroxyethyl vinyl ether) (6)

Polymerization reaction was carried out with the similar operation as Example 1 except that 2-propanol was used as a polymerization solvent. As a result, the monomer conversion rate was 31%, the number average molecular weight Mn of the obtained polymer was 15800, and the molecular weight distribution Mw/Mn was 1.55 after an elapse of 24 hours.

Comparative Example 3

Production of poly(2-hydroxyethyl vinyl ether) (7)

Polymerization reaction was carried out with the similar operation as Example 1 except that ethylene glycol was used as a polymerization solvent. As a result, the monomer conversion rate after an elapse of 24 hours was 71% but polyacetal was generated in 60%. The number average molecular weight Mn of the obtained polymer was 10100, and the molecular weight distribution Mw/Mn was 1.73.

Comparative Example 4

Production of poly(4-hydroxyethyl vinyl ether) (8)

Polymerization reaction was carried out with the similar operation as Example 1 except that 1,4-butanediol was used as a polymerization solvent. As a result, the monomer conversion rate after an elapse of 24 hours was 69% but polyacetal was generated in 40%. The number average molecular weight Mn of the obtained polymer was 9500, and the molecular weight distribution Mw/Mn was 1.79.

Comparative Example 5

Production of poly(4-hydroxybutyl vinyl ether) (2)

Polymerization reaction was carried out with the similar operation as Example 4 except that 2,2'-azobisisobutyronitrile (manufactured by Wako Pure Chemical Industries, Ltd., product name V-60, hereinafter referred to as "AIBN") was used as a radical polymerization initiator. As a result, the monomer conversion rate was 37%, the number average molecular weight Mn of the obtained polymer was 29400, and the molecular weight distribution Mw/Mn was 1.73 after an elapse of 48 hours.

Comparative Example 6

Production of poly(4-hydroxybutyl vinyl ether) (3)

To a glass vessel with a three-way cock, 68.25 g (587.6 mmol) of HBVE and 17.82 g of methanol was added and heated, and a solution in which 1.3393 g (5.82 mmol, 1 mol % based on a monomer) of MAIB was dissolved in 11.91 g of methanol was added drop wise over 1 hour after the internal temperature reached to 70° C. Then, stirring was carried out for 8 hours at 70° C. 70.58 g of methanol was added and the content was cooled down to room temperature, and extraction was carried out three times with 168.8 g of hexane to remove the residual monomers and the polymerization initiator residues. Then, the solvent was removed under reduced pressure to obtain poly(4-hydroxybutyl vinyl ether). As a result, the monomer conversion rate was 56.7%, the number average molecular weight Mn of the obtained polymer was 32000, and the molecular weight distribution Mw/Mn was 1.35.

Comparative Example 7

Production of poly(4-hydroxybutyl vinyl ether) (4)

Polymerization reaction was carried out with the similar operation as Comparative Example 6 except that the amount of MAIB used was changed to 5 mol % based on a monomer. As a result, the monomer conversion rate was 91.67%, the number average molecular weight Mn of the obtained polymer was 34000, and the molecular weight distribution Mw/Mn was 1.24.

Example 8

Production of poly(4-hydroxybutyl vinyl ether) (5)

To a glass vessel with a three-way cock, 90 g of water, 90 g (774 mmol) of HBVE, 29.7 g (129 mmol, 16.7 mol % based on the total amount of monomers) of MAIB were introduced and heated at 70° C., then the polymerization was carried out for 10 hours under stirring. After cooling down to room temperature, water and light components were removed by evaporation to obtain poly(4-hydroxybutyl vinyl ether) of interest. The HBVE conversion rate was 99% or more, the number average molecular weight Mn of the obtained polymer was 3090, and the molecular weight distribution Mw/Mn was 2.40.

Example 9

Production of poly(4-hydroxybutyl vinyl ether) (6)

Polymerization reaction was carried out with the similar operation as Example 8 except that the amount of MAIB added was 3 mol % based on a monomer. As a result, the HBVE conversion rate was 89%, the number average molecular weight Mn of the obtained polymer was 5910, and the molecular weight distribution Mw/Mn was 1.78.

Example 10

Production of 4-hydroxylbutyl vinyl ether/diethylene glycol monovinyl ether copolymer (1)

To a glass vessel with a three-way cock, 90 g of water, 71.9 g (619 mmol) of HBVE, 20.6 g (156 mmol) of DEGV, 29.7 g (129 mmol, 16.6 mol % based on the total amount of monomers) of MAIB were introduced and heated at 70° C., then the polymerization was carried out for 10 hours under stirring. After cooling down to room temperature, water and light components were removed by evaporation to obtain a HBVE/DEGV copolymer of interest. The HBVE C was 99.6%, the DEGV conversion rate was 94.2%, the number average molecular weight Mn of the obtained polymer was 3160, and the molecular weight distribution Mw/Mn was 2.13.

TABLE 1

| | Polymerization Solvent | Polymerization Initiator Type | Added Amount (mol %) | Monomer Type | Residual Amount (mol %) | Polymer Number average molecular weight Mn | molecular weight distribution Mw/Mn |
|---|---|---|---|---|---|---|---|
| Example 1 | water | MAIB | 0.2 | HEVE | Less than 1 | 33900 | 2.45 |
| Example 2 | water | MAIB | 0.2 | HEVE | Less than 1 | 10700 | 1.59 |
| Example 3 | water | V-086 | 0.2 | HEVE | Less than 1 | 11400 | 1.94 |
| Example 4 | water | MAIB | 0.2 | HBVE | Less than 1 | 15500 | 2.20 |
| Example 5 | water | MAIB | 0.2 | CHDMVE | 19 | 12300 | 1.89 |
| Example 6 | water | MAIB | 0.2 | DEGVE | Less than 1 | 12600 | 2.10 |
| Example 7 | water | MAIB | 0.1 | HEVE | Less than 1 | 35500 | 1.74 |
| Comparative Example 1 | toluene | MAIB | 0.2 | HEVE | 51 | 18900 | 1.68 |
| Comparative Example 2 | 2-propanol | MAIB | 0.2 | HEVE | 69 | 15800 | 1.55 |
| Comparative Example 3 | Ethylene glycol | MAIB | 0.2 | HEVE | 29 | 10100 | 1.73 |
| Comparative Example 4 | 1,4-butanediol | MAIB | 0.2 | HEVE | 31 | 9500 | 1.79 |
| Comparative Example 5 | water | AIBN | 0.2 | HBVE | 63 | 29400 | 1.73 |
| Comparative Example 6 | methanol | MAIB | 1 | HBVE | 43.3 | 32000 | 1.35 |
| Comparative Example 7 | methanol | MAIB | 5 | HBVE | 8.33 | 34000 | 1.24 |
| Example 8 | water | MAIB | 16.7 | HBVE | Less than 1 | 3090 | 2.40 |
| Example 9 | water | MAIB | 3 | HBVE | 11 | 5910 | 1.78 |
| Example 10 | water | MAIB | 16.6 | HBVE/DEGVE | 0.4/5.8 | 3160 | 2.13 |

The invention claimed is:

1. A method for producing a hydroxyl group-containing vinyl ether polymer, comprising:
a step of radical polymerizing at least one vinyl ether selected from vinyl ether having a hydroxyl group represented by the following formula (2):

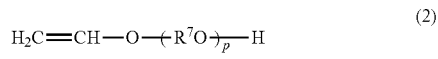

(2)

wherein $R^7$ represents an alkylene group which is straight-chained, branched or comprises an alicyclic structure, and p is 1, 2, or 3,
in the presence of water as a polymerization solvent and dimethyl 2,2'-azobis (2- methylpropionate) as a polymerization initiator, and the amount of said dimethyl 2,2'-azobis (2-methylpropionate) added is from 0.01 to 0.5 mol % based on said vinyl ether,
wherein the monomer conversion rate is 95% or more in the step of radical polymerization.

2. The method for producing a polymer according to claim 1, wherein
the monomer conversion rate is 99% or more in the step of radical polymerization.

3. The method for producing a polymer according to claim 1, wherein
the amount of said dimethyl 2,2'-azobis(2-methylpropionate) added is from 0.01 to 0.2 mol % based on said vinyl ether and the number average molecular weight Mn of the hydroxyl group-containing vinyl ether polymer is from 10,000 to 600,000.

4. A method for producing an aqueous hydroxyl group-containing vinyl ether polymer solution comprising water and a hydroxyl group-containing vinyl ether polymer, the method comprising:
a step of radical polymerizing at least one vinyl ether selected from vinyl ether having a hydroxyl group represented by the following formula (2):

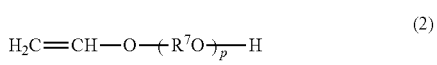

(2)

wherein $R^7$ represents an alkylene group which is straight-chained, branched or comprises an alicyclic structure, and p is 1, 2, or 3,
in the presence of water as a polymerization solvent and dimethyl 2,2'-azobis(2-methylpropionate) as a polymerization initiator, and the amount of said dimethyl 2 2'-azobis (2-methylpropionate) added is from 0.01 to 0.5 mol % based on said vinyl ether,
wherein the monomer conversion rate is 95% or more in the step of radical polymerization; and
a step of storing the obtained hydroxyl group-containing vinyl ether polymer in an aqueous solution.

5. The method for producing an aqueous polymer solution according to claim 4, wherein
the monomer conversion rate is 99% or more in the step of radical polymerization.

6. The method for producing an aqueous polymer solution according to claim 4, wherein the amount of said dimethyl 2,2'-azobis(2-methylpropionate) added is from 0.01 to 0.2 mol % based on said vinyl ether and the number average molecular weight Mn of the hydroxyl group-containing vinyl ether polymer is from 10,000 to 600,000.

* * * * *